United States Patent [19]

McGill

[11] 3,715,558
[45] Feb. 6, 1973

[54] WELDING APPARATUS

[75] Inventor: Thomas Alan McGill, Hamilton, Mass.

[73] Assignee: The Gillette Company, Boston, Mass.

[22] Filed: Sept. 29, 1970

[21] Appl. No.: 76,525

Related U.S. Application Data

[62] Division of Ser. No. 758,465, Sept. 9, 1968, Pat. No. 3,597,571.

[52] U.S. Cl. .................................. 219/82, 219/81
[51] Int. Cl. ................................. B23k 11/06
[58] Field of Search ................... 219/81–84, 91, 219/117, 111

[56] References Cited

UNITED STATES PATENTS

| | | | |
|---|---|---|---|
| 3,313,911 | 4/1967 | Seeloff | 219/105 |
| 2,663,784 | 12/1953 | Iversen | 219/10 |
| 2,957,976 | 10/1960 | Green | 219/81 |
| 1,787,039 | 12/1930 | Gibb | 219/81 |
| 1,965,521 | 7/1934 | Cutter | 219/81 |
| 3,165,818 | 1/1965 | Soffa et al. | 219/85 |
| 2,684,424 | 7/1944 | Anderson | 219/81 |

Primary Examiner—J. V. Truhe
Assistant Examiner—Gale R. Peterson
Attorney—Willis M. Ertman

[57] ABSTRACT

Welding sheets of 0.0015 inch thick stainless steel razor blade stock together by overlapping two ends of two sheets 0.0040 inch, inserting the overlapped ends between the peripheral welding surfaces of two adjacent copper-tungsten alloy welding rollers, forming a spot weld under pressure by applying a 1,000 ampere, 60 cycle current at 3.8 volts to the rollers for 8 cycles, advancing the overlap longitudinally between the rollers for a distance about one-third the average length of the spot weld, stopping this advance and forming a second spot weld, and repeating this process until the entire overlap is welded.

2 Claims, 5 Drawing Figures

PATENTED FEB 6 1973

WELDING APPARATUS

This application is a division of my co-pending patent application Ser. No. 758,465 filed Sept. 9, 1968, now U.S. Pat. No. 3,597,571, granted Aug. 3, 1971.

This invention relates to apparatus for welding thin metal elements, and particularly, for joining together strips of razor blade stock.

The manufacture of razor blade elements of the thin strip type involves a number of operations, sequentially applied to a long strip of razor blade stock, which is ultimately cut to the desired length. The stock is both thin (a typical thickness being in the order of 0.0015 inch) and narrow (a typical width being in the order of 0.190 inch), yet of sufficient strength and durability to withstand the succession of heating, quenching, tempering, sharpening, abrading, coating, and cutting steps involved in blade manufacture. This narrow stock is obtained by longitudinally slitting a wider stock into a number of strips. Because of manufacturing and handling considerations, and specifically to avoid excess stopping and starting of machinery, and the delay, as well as the machinery wear, thus encountered, it is desirable to join lengths of razor blade strips together end to end to form a single, very long strip. The joints must be metallurgically compatible with the processing steps (i.e., free of materials which would soften, vaporize, lose strength, etc.), strong enough to withstand the various stresses of the blade forming process (e.g., hardening sharpening, cutting, etc.), and of a smoothness, uniformity and thickness which will not unduly interfere with the processing steps. Moreover, the joining procedure should not be so time-consuming as to destroy the advantage gained in process continuity, and for this reason, welding together individual strips after slitting has proven unsatisfactory.

It is therefore an object of this invention to provide apparatus for joining together sheets of razor blade stock of a thickness of the order of 0.0015 inch in a manner not incompatible with subsequent processing of the stock into razor blade members.

It is another object to provide an improved apparatus for welding together thin metal sheets.

It is another object to provide apparatus for joining thin metal sheets in a strong, smooth, and continuous weld. The invention features apparatus for welding together a narrow elongated overlap formed by the overlapping ends of two thin metal sheets comprising: structure for supporting the sheets including a slot positioned beneath the overlap; a first rotatable welding roller secured beneath the overlap in the slot and contacting the underside of the overlap; a second welding roller aligned with the first roller and secured above the overlap; means for bringing the second roller into contact with the upper side of the overlap to hold the overlap under pressure between the rollers; the support structure being movable, in the direction of elongation of the overlap, to advance the overlap between the rollers; and indexing means for intermittently advancing the support and overlap a predetermined increment between the rollers while simultaneously preventing welding current flow through said rollers, and for intermittently ceasing advance of the support structure while allowing welding current to flow through the rollers. In preferred embodiments, this apparatus is used to weld sheets of 0.0015 inch stainless steel razor blade stock having as principal metallurgical constituents, in addition to iron, 0.40 percent carbon and 13.5 percent chromium by overlapping them about 0.040 inch, applying a total current of 1,000 amps at 3.8 volts for 8 cycles (from a 60 cycle power source) to form spot welds of 0.035 to 0.040 inch diameter, and advancing the overlapping portion about one third this diameter (about 0.012 inch). In a particular embodiment, the support structure comprises a movable base having a slot and two platens secured thereto on either side of the slot; one of the platens is movable, toward the other, by means of lever arms secured to the platen and to the base, whereby the platen lies on the base at positions on either side of an unstable center position, and off the base when moving from one to the other, such that moving the platen towards the roller lifts the sheet thereon into overlap with the sheet secured to the second platen; each platen has a raised lip along the forward advancing edge to align the sheets; each platen has a plurality of suction ducts on the surface adjacent the sheet to clamp the sheet; and means are provided to produce a force sufficient to drive one of the welding rollers (preferably, the lower one) during advancing of the support but insufficient to drive it when the support is stopped.

Other objects, features, and advantages will appear from the following description of a preferred embodiment of the invention, taken together with the attached drawings thereof, in which.

Figure 1:
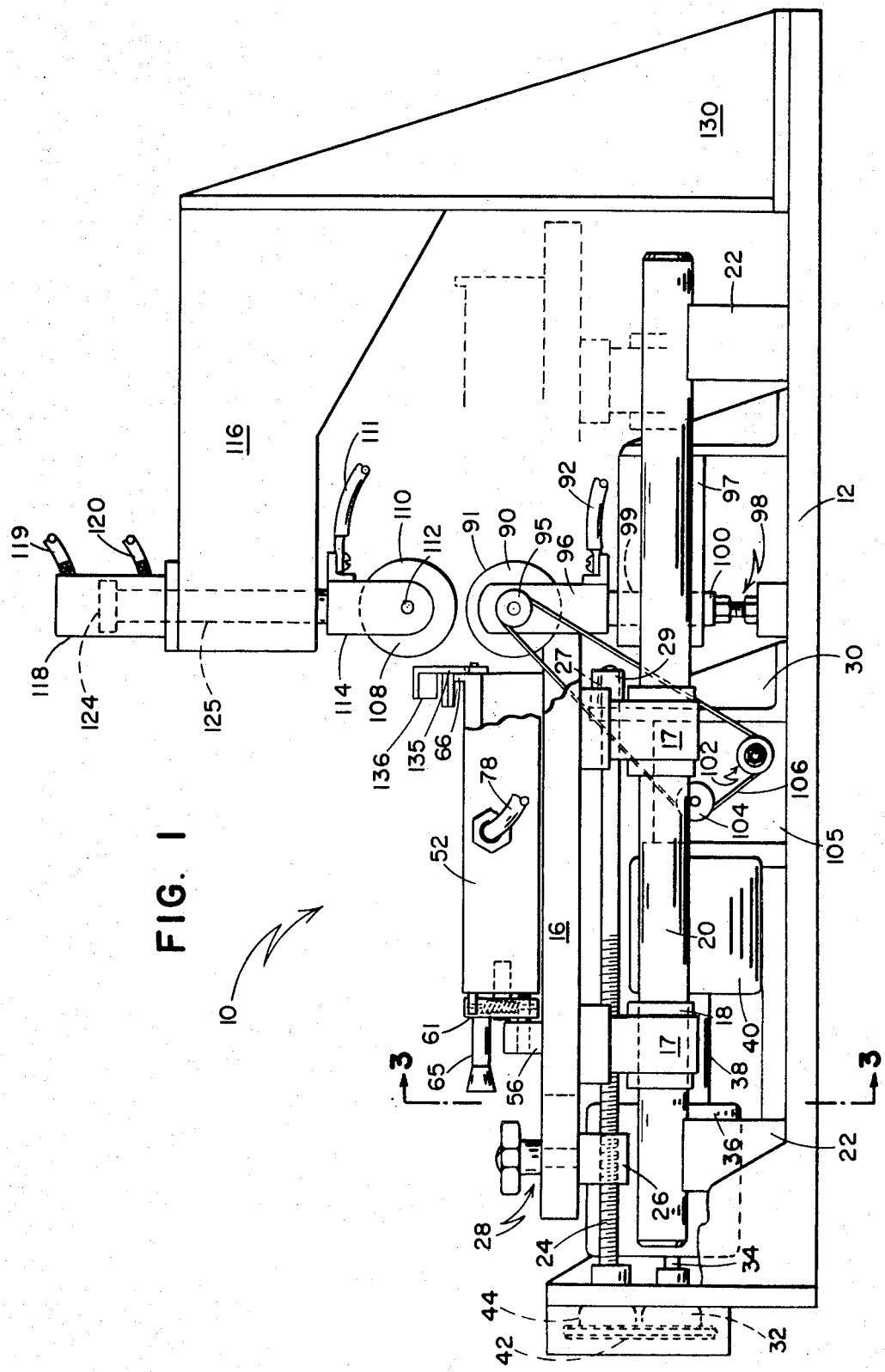
FIG. 1 is a side elevational view, partially broken away, of a preferred embodiment of the invention, showing, in phantom, moving parts of the apparatus at a second position.

In the Figures, there is shown a welding apparatus 10 supported on a base 12. A movable platen support 16 is secured, on legs 17 which house bearing assemblies 18, for axial movement along stationary rods 20 which are rigidly secured by rod supports 22 to base 12. This axial movement is produced by rotation of threaded lead screw 24 in internally threaded nut 26. Nut 26 is secured to support 16 and includes a "quick release" assembly 28 extending through platen support 16 for disengaging the mating threads of screw 24 and nut 26, where rapid manual axial movement of support 16 is desired. Lead screw 24 is supported at one end by an unthreaded portion 27 maintained in bearing assembly 29, which is supported, by member 30, on base 12. The rotation of lead screw 24 is controlled by indexing means which includes a drive sprocket 32 driven via shaft 34 by Geneva gear assembly 36 which is in turn driven via shaft 38 by motor 40. Sprocket 32 drives chain 42 which in turn drives sprocket 44 that is secured to lead screw 24.

Figure 2:
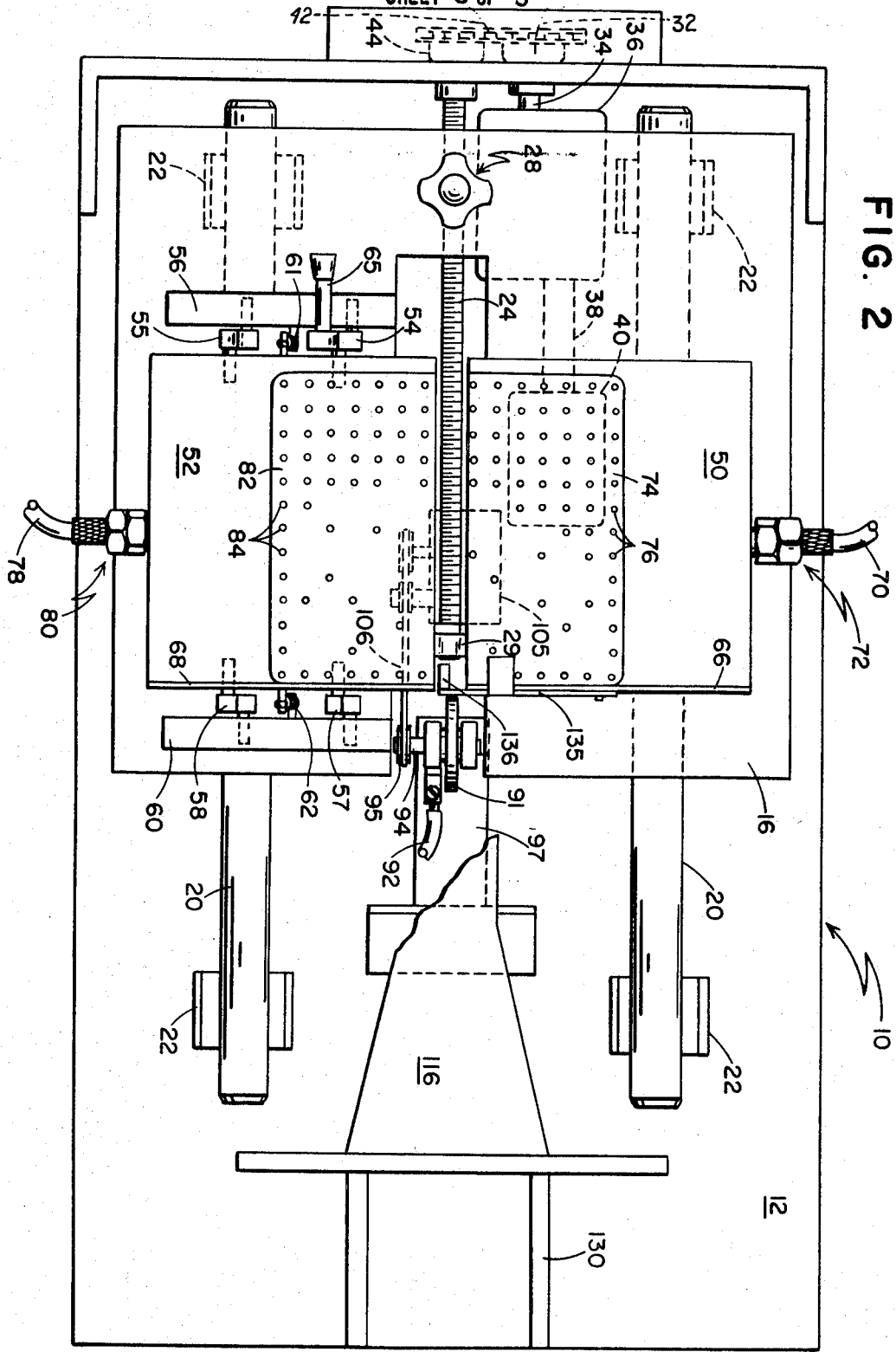
FIG. 2 is a plan view of the embodiment of FIG. 1.

Referring now to FIG. 2, there are shown two aluminum platens—a stationary platen 50 attached to platen support 16, and a movable platen 52 movable with respect to support 16 by means of lever arms 54, 55, which are secured at one end to platen 52 and at the other end to stationary bar 56 and by means of lever arms 57, 58, which are secured to platen 52 and to stationary bar 60. Springs 61, 62 maintain platen 52 flush with platen support 16, on either side of an unstable center portion in which the platen is raised off support 16 by reason of the lever arms, this over center movement being manually directed by handle 65 secured to lever arm 54.

Each platen 50, 52, includes an upraised alignment lip 66, 68, respectively, extending along the far edge (FIG. 3) of the platen.

Figure 3:
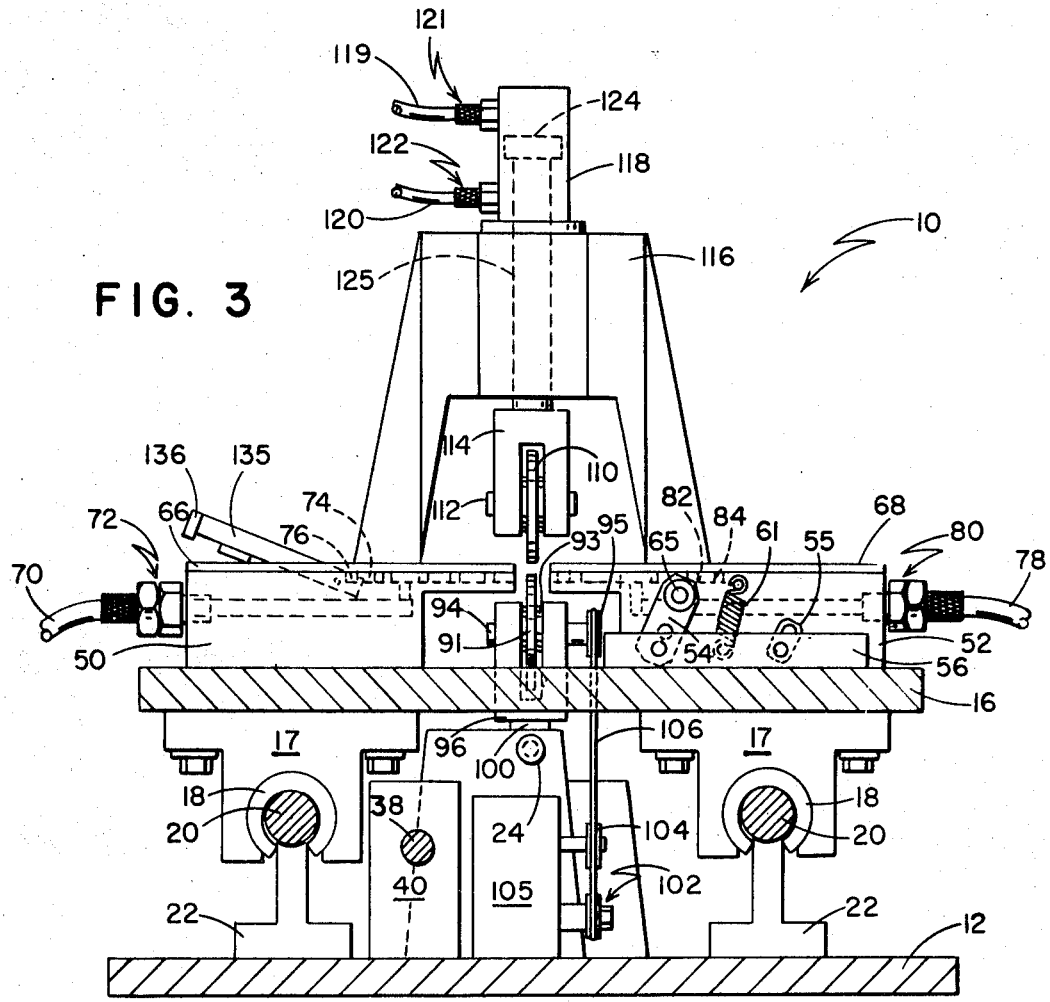
FIG. 3 is an end sectional view taken along line 3—3 of FIG. 1.

Referring to FIGS. 2 and 3, suction hose 70 is attached through connecting means 72, to vacuum chamber 74 inside platen 50, which communicates with a plurality of ports 76 in the upper surface of the platen. Similarly, suction hose 78 is connected through connecting means 80, to vacuum chamber 82 inside platen 52, which communicates with a plurality of ports 84 in the upper surface of platen 52. Lower copper-tungsten alloy welding roller 90, which has a diameter of 2 inches, and a 0.094 inch wide peripheral welding surface 91 is connected by cable 92 to a 60 cycle power source and secured on shaft 93, which includes a reduced diameter extension 94 for supporting drive wheel 95. Shaft 93 is rotatably supported on support member 96, which rests on an insulator that is secured to base 12, and also to lateral support member 97. Support member 96 also includes an adjusting means 98 for adjusting the distance of shaft 93 above base 12 and member 97 includes a bore 99 through which adjusting rod 100 of member 96 is journalled. Shaft 93 (and hence welding roller 90) is driven, in a manner and at a speed later described, by drive wheel 95 (connected to drive wheel assembly 102, which includes a tension assembly) through idler wheel 104, motor 105, and chain 106.

Upper copper-tungsten alloy welding roller 108 also having a diameter of 2 inches and a 0.094 inch wide peripheral welding surface 110, is connected to the power source by cable 111 and is secured on shaft 112 which is rotatably secured in block 114. Mounted on roller support structure 116 is a cylinder 118, which is connected by hoses 119, 120 through coupling means 121, 122, respectively, to a source of air pressure (not shown), by means of which piston head 124, piston rod 125, and hence roller 108 may be vertically adjusted.

The entire piston assembly and support for roller 108 is supported on upright supporting structure 130, secured to base 12.

The operation of this apparatus will now be described with particular reference to the welding of two sheets 132, 134 (FIGS. 4, 5) of razor blade stock 0.0015 inch thick and 6 inches wide, made of stainless steel having, as principal metallurgical components, in addition to iron, 0.40 percent carbon and 13.5 percent chromium. The ends of the stock are squared off to exactly 90° and aligned with the rear alignment lips 66, 68 of the respective platens 50, 52, platen 52 being positioned as shown in FIG. 3. A stop structure 135 hinged to fixed platen 50 and which includes a projecting arm 136 is provided for properly positioning the lateral sides of the two strips overhanging the edges of platens 50, 52.

Figure 4:
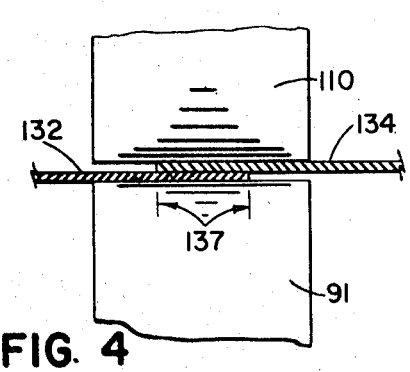
FIG. 4 is an enlarged view showing the placement of the stock between the welding rollers; and, FIG. 5 is a diagrammatic view of a welded portion of stock, indicating the amount of overlap between successive welds.

The stop projection 136, when in aligning position is disposed between platens 50, 52 (as indicated in FIG. 2) and is swung out of the way when alignment is complete (as indicated in FIGS. 1 and 3). After alignment the stock is clamped to the respective platens by suction applied to parts 76, 84 (no suction being applied until alignment is complete). If desired, auxiliary clamps may be used in addition to the suction means to maintain the stock aligned and flush with the surface of the platens. Platen 52 is then moved, by operation of handle 65, toward platen 50, the slight raising of platen 52 off the surface of platen support 16 allowing the edge of sheet 134 to overlap the edge of sheet 132, the resultant narrow elongated overlap 137 being vertically aligned with the welding rollers as indicated in FIG. 4.

The forward side of the overlap 137 is then aligned (e.g., manually) with the welding rollers such that when the upper roller is moved down into contact with overlap 137, no part of the welding surfaces 91, 110 are in contact with one another. Since approximately 0.090 inch from each longitudinal edge of the welded stock is discarded it is not necessary that the weld extend all the way to the edge. This manual adjustment of platen support 16 is conveniently carried out with quick release assembly 28 in the release position. When alignment is completed, nut 26 is re-affixed to lead screw 24, making further manual movement of platen support 16 impossible.

Upper roller 108 is lowered onto overlap 137 by applying air pressure of about 25 p.s.i. above piston head 124, and contact pressure is maintained by the resultant air spring.

Motor 105 is actuated to drive lower welding roller 90. However, by reason of the low torque applied to drive wheel 102, that drive wheel does not turn lower welding roller 90 against the friction of the overlap 137 when platen support 16 is not moving and roller 108 is under air pressure.

Figure 5:
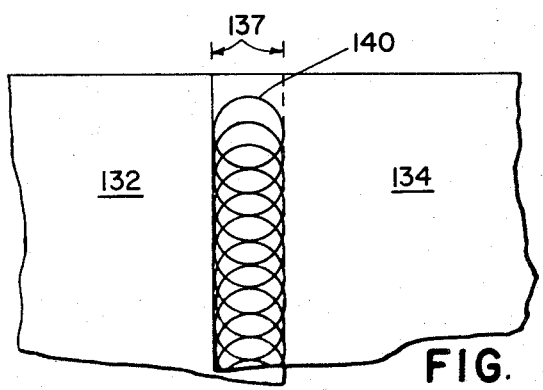

Motor 40 of the indexing mechanism is then actuated to carry out the following sequence. Lead screw 24 is incrementally turned to advance platen support 16 0.012 inch, while no current flows through welding rollers 90, 108. The indexing means then simultaneously stops platen support 16 while tripping a switch to supply welding current to rollers 90, 108. A welding current of 1,000 amps at 3.8 volts is applied for 8 cycles to produce a spot weld 140 of generally circular configuration that has a diameter of 0.035 to 0.040 inch (FIG. 5). The indexing mechanism then opens the switch, the platen support moved another 0.012 inch and the process is repeated to form a series of overlapping welds 140 across the entire width of strips 132, 134, stopping the welding rollers 90, 108, so that its surfaces do not contact one another at the other side (rear) of the strips. The movement of the various elements is indicated in phantom in FIG. 1.

The resultant weld is comparable in strength to the parent metal. Prior to slitting the metal strips into continuous strips 0.19 inch wide, the weld may be dressed down, using, e.g., crocus cloth, from 0.0031–0.0032 inch to about 0.0024 inch.

Other embodiments will occur to those skilled in the art and are within the following claims.

What is claimed is:

1. Apparatus for welding together a narrow, elongated overlap formed by the overlapping ends of two thin metal sheets comprising support structure for supporting said sheets including two adjacent planar support platens secured to a base, and spaced from each other, each said platen including means for maintaining said metal sheet flush upon the platen surface, a first rotatable lower welding roller secured beneath said platens for contacting, along its circumference, the underside of said overlap, a second rotatable upper welding roller aligned with said first roller and secured above said overlap, means for moving said second roller down into contact with the upper side of said overlap and maintaining said overlap under pressure between said rollers, overlap establishing structure for moving one platen towards the welding rollers and the other platen, said overlap establishing structure including at least one lever arm on the forward and rearward sides of said one platen, each arm secured to said base, and means for pivoting said one platen on said lever arms to move said one platen toward said other platen, said lever arms being positioned to allow said one platen to lie flush with said base in positions on either side of an unstable center position, and to lift said platen off said base in passing through said unstable center position, whereby the ends of said metal strips on said platens may be overlapped by movement of said one platen toward said other platen, platen drive structure for moving said platens in the direction of elongation of said overlap to advance said overlap between said rollers, means for moving said welding rollers into engagement with the metal strips to be welded, means for applying welding current to said welding rollers while said rollers are in engagement with the metal strips, and indexing means for intermittently moving said platens an incremental distance to advance said overlap between said rollers while simultaneously preventing welding current flow through said welding rollers, said incremental distance being less than one half the average diameter of a spot weld formed by said overlap, and for intermittently ceasing movement of said support structure and allowing welding current flow through said welding rollers.

2. The apparatus of claim 1 wherein each said platen includes a plurality of suction ducts each communicating with the surface of said platen and with a suction chamber beneath said surface for maintaining said metal sheet flush upon said platen surface.

* * * * *